Dec. 15, 1942.   R. P. DUNMIRE   2,305,519
FLUID RELIEF VALVE
Filed Dec. 31, 1940

INVENTOR.
Russell P. Dunmire.
BY
Hoodling and Krost attys.

Patented Dec. 15, 1942

2,305,519

UNITED STATES PATENT OFFICE 2,305,519

FLUID RELIEF VALVE

Russell P. Dunmire, Alliance, Ohio, assignor to The Buckeye Laboratories, Inc., a corporation of Ohio Application December 31, 1940, Serial No. 372,545

4 Claims. (Cl. 137—53)

My invention relates in general to fluid relief valves and more particularly to fluid relief valves giving a double valve action.

An object of my invention is the provision of a fluid relief valve arranged to give a poppet valve sealing action and a slide valve regulating action.

Another object of my invention is the provision of a fluid relief valve which may be readily installed in place of a conventional ball-check relief valve.

Another object of my invention is the provision of a relief valve which finds particular utility in connection with a fluid pump to govern the discharge pressure of the pump within an extremely narrow range.

Another object of my invention is the provision of a relief valve directly adaptable to a pump and forming an integral part of the pump porting.

Another object of my invention is the provision of effecting a ground metal-to-metal type of sealing action to prevent air from being drawn into the pump during the priming of the pump.

Another object of my invention is the provision of a fluid relief valve which may be readily and easily adjusted to regulate the fluid pressure at which the valve operates.

Another object of my invention is the provision of gradually regulating the fluid communication through the valve by means of a series of spirally spaced openings through which the fluid flows to effectively throttle the flow of fluid in a smooth continuous manner and not in steps.

Another object of my invention is the provision of throttling ports arranged in a spiral manner to give a uniform graduated opening for controlling the volume of the fluid flowing through the relief valve and so disposed as to prevent "wire drawing" or cutting of the poppet valve seat.

Another object of my invention is the provision of hydraulically cushioning the movements of the relief valve.

Other objects and a fuller understanding of my invention may be had by referring to the following description and claims, taken in conjunction with the accompanying drawing in which:

Figure 1:
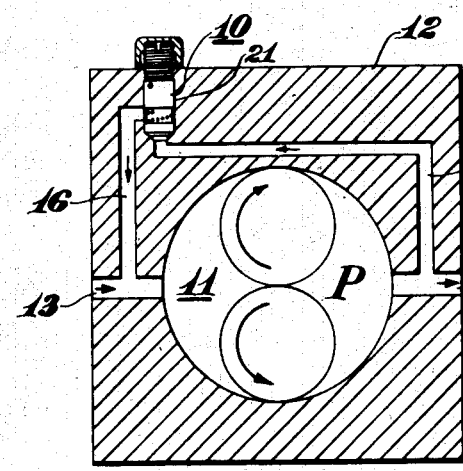
Figure 1 represents a diagrammatical cross-sectional view of a pump embodying my relief valve.

With reference to Figure 1, my relief valve is indicated by the reference character 10 and is arranged to be employed in combination with a pump 11 having a housing 12 with a feed conduit 13 and a discharge conduit 14. My relief valve functions to by-pass fluid from the discharge conduit 14 to the feed conduit 13 through means of by-pass conduits 15 and 16 of the pump housing 12 and operates to control the discharge pressure of the pump effectively within an extremely narrow range.

Figure 2:
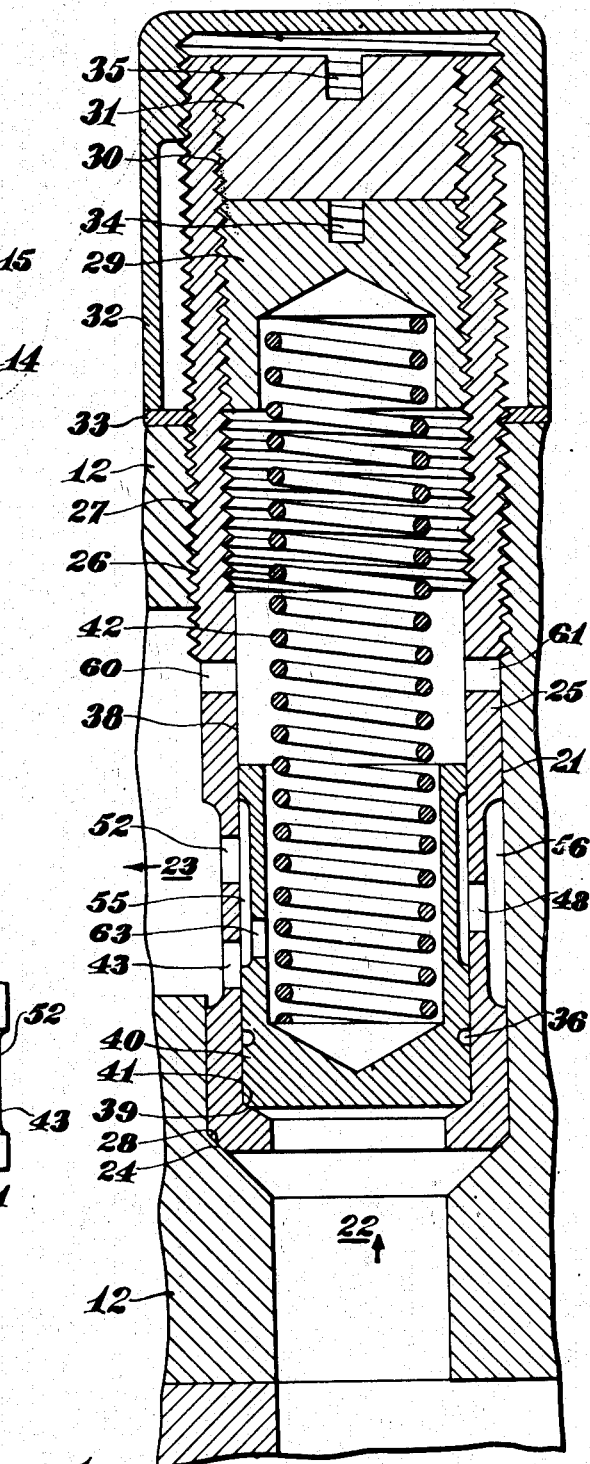
Figure 2 is an enlarged longitudinal cross-sectional view of my relief valve.

With reference to Figure 2, my relief valve is arranged to fit into an elongated opening 21 in the pump housing. As illustrated, the elongated opening 21 has a fluid inlet 22 in communication with the by-pass conduit 15 and a fluid outlet 23 in communication with the by-pass conduit 16. The elongated opening 21 is provided at its lower end with a terminal shoulder surface 24 and is provided at its upper end with internal threads 26. Fitting into the elongated opening 21 is a hollow sleeve 25 having at its lower end an abutting surface 28 and at its upper end external threads 27 adapted to threadably engage the internal threads 26 of the elongated opening 21. The hollow sleeve 25 may be readily mounted in the elongated opening 21 by threadably turning same therein until the abutting surface 28 firmly seats itself against the terminal shoulder surface 24 of the elongated opening 21. Therefore, when the hollow sleeve 25 is tightly turned within the elongated opening 21 a good seal is established between the abutting surface 28 of the sleeve and the terminal shoulder surface 24 of the elongated opening 21. The upper end of the hollow sleeve 25 is provided with internal threads 30 to receive a threaded closure plug 29. The closure plug 29 may be prevented from rotating, when once set, by a locking plug 31 threadably engaging the internal threads 30 in the top of the hollow sleeve 25 and frictionally abutting against the closure plug 29. As shown, both the closure plug 29 and the locking plug 31 may be provided with transverse slots 34 and 35 respectively, to receive a screw driver or any other suitable tool for threadably turning same. The upper end of the hollow sleeve 25 may be covered by means of a threaded cap 32 having internal threads for threadably engaging the threads 27 of the hollow sleeve 25. A lock washer 33 may be positioned between the threaded cap 32 and the housing 12 of the pump to prevent the threaded cap 32 from becoming loose when once tightened.

As illustrated, the hollow sleeve 25 is provided with an internal bore 38 having at its lower end an inclined internal valve seat 39 with an opening therethrough in fluid communication with the fluid inlet 22. Slidably mounted within the internal bore 38 of the hollow sleeve 25 is a slidable valve plunger 40. The lower end of the valve plunger 40, represented by the reference character 41, may be designated as a valve engaging portion which seats against the internal valve seat 39 of the hollow sleeve 25. The valve engaging portion 41 is biased firmly against the internal valve seat 39 by means of a coil spring 42 positioned in the bore 38 and between the closure plug 29 and the valve plunger 40. As shown, the closure plug 29 and the valve plunger 40 are longitudinally recessed to receive the opposite ends of the spring 42. The arrangement of the end engaging portion 41 of the valve plunger 40 and the internal valve seat 39 constitutes a poppet valve means to make a good seal. The valve seat 39 and the valve engaging portion 41 may be ground to effect a ground metal-to-metal type of seal. The lowermost end portion of the valve plunger 40 is provided with a circumferential fluid sealing groove 36 which effectively seals and lubricates the valve plunger 40 and the bore 38 as the plunger slides within the bore.

Figure 3:
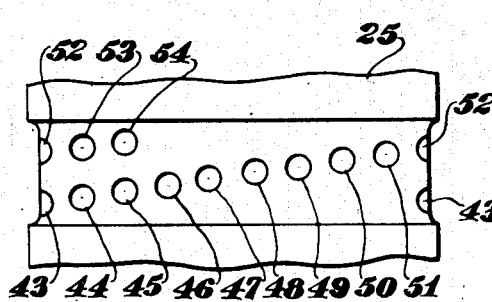
Figure 3 is a fragmentary view of the spirally arranged apertures in my valve and being developed or shown in a flat surface.

Positioned above the internal valve seat 39 and in the side of the hollow sleeve 25, are a series of spirally arranged apertures 43 to 54 inclusive, see Figure 3 which shows the spirally arranged apertures on a flat surface. As the lower end of the valve plunger 40 moves relative to the spirally arranged apertures 43 to 54 inclusive, a gradually varying fluid communication is effected from the bore 38 of the sleeve 21 to the fluid outlet 23. When the lower end of the valve plunger 40 is biased by the fluid inlet pressure to a point above the aperture 54, then all of the apertures 43 to 54 inclusive, are open and when the spring 42 biases the valve plunger 40 so that the lower end thereof is below the aperture 43, then all of the apertures 43 to 54 are closed. As the lower end of the valve plunger moves between the position where all the apertures are closed and the position where all of the apertures are open, a gradually varying regulated flow is effected, depending upon the combined area of the apertures which are in free communication between the bore 38 and the fluid outlet 23. The vertical spacing of adjacent apertures, as they spiral around the hollow sleeve 25, is such that there is a vertical overlapping of the apertures so that the regulation of the fluid communication therethrough is uniform, continuous and gradual instead of abrupt or in steps as the lower end of the valve plunger moves relative to the apertures. The outside of the hollow sleeve 25 surrounding the spirally disposed apertures, is provided with a relatively long circumferential recess 56 so as to provide a circumferential fluid communication between the sleeve 25 and the elongated opening 21 in the pump housing 12, to the end that all of the apertures 43 to 54 are in fluid communication with the fluid outlet 23. The arrangement of the valve plunger 40 slidably moving in the bore 38 constitutes a slidable valve means to regulate the fluid communication from the bore 38 to the fluid outlet 23.

My relief valve finds particular advantage when used in combination with a fluid pump, in that a double sealing action is provided during the priming of the pump to prevent air from being drawn into the pump which, if allowed to occur, would prevent the priming of the pump. The double sealing action is afforded by the metal-to-metal poppet valve means and the slide valve means. Of these two valve means the poppet valve means is the more effective in providing an air tight seal because of the ground metal-to-metal sealing action. One reason for this is that during idle periods of the pump, the sliding parts of the slide valve means might become dry, since there is no fluid in the relief valve to provide a fluid film between the sliding parts, and thus allow air to be drawn through the sliding parts of the slide valve means and prevent the priming of the pump. Another reason results from the free clearance movements of the sliding valve parts. For sensitive operation, the clearance between the sliding parts of the slide valve means is such as to give free movements to the parts. In making the clearance large enough to give free movement to the sliding valve parts, a difficulty arises in preventing air from being drawn to the pump. Therefore, I provide a poppet valve means to effect a good sealing action of my relief valve during the priming of the pump. After the pump is once primed, the fluid inlet pressure 22 biases the valve plunger 40 upwardly against the spring 42 until a balanced position of the valve plunger is attained, giving a regulated flow through my relief valve in accordance with the functioning of the slide valve means. In other words, the slide valve means functions to regulate the flow of the fluid through my relief valve and the poppet valve means functions to provide a good seal when my relief valve is closed, such as will be the case, during the priming of the pump. The rate of flow of the slide valve means may be governed by adjustably setting the closure plug 29 which varies the pressure of the spring acting on the valve plug 40.

My relief valve may be readily employed to replace a ball-check relief valve in the pump housing 12. I find that ball-check relief valves operate almost instantaneously to relieve the fluid pressure, with the result that the quick and sudden movement of the ball to its wide open position excessively compresses the regulating spring and stores up an excessive amount of kinetic energy therein, beyond the setting of the spring. With the ball occupying the wide open position, the pressure suddenly drops and the stored kinetic energy of the spring thrusts the ball back upon its seat. This cycle of operation results in chattering of the ball upon the valve seat until the valve seat is damaged. In replacing a ball-check relief valve with my valve, it is only necessary to remove the ball-check relief valve from the elongated opening 21 and assemble my valve therein. The terminal shoulder surface 24 constituted the seat for the ball-check and the threads 26 of the pump housing 12 threadably received the closure cap for the ball-check relief valve. The threads 27 of the hollow sleeve 25 are made to match the threads 26 and the abutting surface 28 is made to make a good seal with the terminal shoulder surface 24. Consequently, my valve may readily replace a ball-check relief valve in the pump housing 12 without changing the pump housing.

The combined action of my poppet valve means and the slide valve means prevents "wire drawing" or cutting of the poppet valve seat 39. One reason for this is that the poppet valve means is wide open before the slide valve means functions to regulate the flow of the fluid through the valve. That is to say, the apertures are disposed a considerable distance from the poppet valve seat 39 and thus by the time that the valve plunger 40 moves a sufficient distance to begin to open the apertures, the poppet valve is wide open and "wire drawing" is prevented.

To provide a shock absorber or cushioning action to the sliding movements of the valve plunger 40, the upper portion of the bore 38 in which the spring 42 is positioned between the valve plunger 40 and the closure plug 29, is connected in restricted fluid communication with the fluid outlet 23 through restricted openings 60 and 63. The outside surface of the valve plunger 40 is provided with an elongated circumferential recess 55 so that regardless of the position of the valve plunger, at least one or both of the restricted openings 60 and 63 provide fluid communication between the bore 38 and the fluid outlet 23. In the position illustrated in Figure 2, both the restricted openings 60 and 63 provide fluid communication between the bore 38 and the fluid outlet 23. In the uppermost position of the valve plunger 40 restricted fluid communication from the bore 38 to the fluid outlet 23 is provided through the path including the restricted opening 63, the space of the circumferential recess 55, and the restricted opening 60. An additional restricted opening 61 is positioned diametrically opposite the restricted opening 60 in order to insure, upon turning the hollow sleeve 25 into the elongated opening 21, that at least one of the restricted openings 60 or 61 is in communication with the fluid outlet 23. I find that the shock absorber or cushioning action on my relief valve, as accomplished by the fluid flowing through the restricted openings 60, 61 and 63 upon the sliding movements of the valve plunger 40, is such as to prevent the valve plunger 40 from chattering or damaging the valve seat.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A liquid pressure regulating and relief valve adapted to fit into an elongated opening having a liquid inlet and a liquid outlet comprising, in combination, a hollow sleeve arranged to be secured in the elongated opening, closure means for one end of the hollow sleeve, said hollow sleeve having an internal bore and having at its other end an internal valve seat with a valve opening therethrough in communication with the liquid inlet, said hollow sleeve having aperture means in the side thereof spaced from said internal valve seat and providing liquid communication between said bore and said liquid outlet, a valve plunger slidably mounted in the bore and having an end engaging portion engaging the internal valve seat, said end engaging portion being exposed to the inlet liquid pressure and urged away from said valve seat, resilient means in the bore and positioned between the closure means and the valve plunger for urging the end engaging portion of the valve plunger against the internal valve seat in opposition to the inlet liquid pressure, the arrangement of the end engaging portion and the internal valve seat constituting a poppet valve means to make a good seal, the arrangement of the valve plunger slidably moving in the bore constituting a slide valve means to regulate the liquid communication from the bore to the fluid outlet through the said aperture means in the side of the sleeve, the portion of the bore in which the resilient means is positioned between the valve plunger and the closure means being in restricted liquid communication with the outlet to provide a shock absorber effect to the slidable movements of the plunger within the said bore, said inlet liquid pressure acting upon the said end engaging portion of the valve plunger constituting the sole means for moving the valve plunger away from said valve seat.

2. A fluid pressure regulating and relief valve adapted to fit into a casing provided with an elongated opening having a fluid inlet and a fluid outlet and having a terminal shoulder surface at the bottom end thereof and female threads at the upper end thereof, comprising, in combination, a hollow sleeve arranged to fit into the elongated opening, said sleeve having at the bottom end thereof an abutting surface for engaging said terminal shoulder surface and having at the upper end thereof male threads for threadably engaging the said female threads, the threadable engagement between said threads constraining the abutting surface of the sleeve against the terminal shoulder surface to make a good seal therebetween, said hollow sleeve having an internal bore extending therethrough, said bore being provided at the upper end thereof with female threads and at the lower end thereof with an internal valve seat having a valve opening therethrough in communication with the fluid inlet, a closure plug fitting in the upper end of the hollow sleeve and having male threads for threadably engaging the female threads in the internal bore of the sleeve, said hollow sleeve having aperture means in the side thereof spaced from said internal valve seat and providing fluid communication between said bore and said fluid outlet, a valve plunger slidably mounted in the bore and having an end engaging portion engaging the internal valve seat, said end engaging portion being exposed to the inlet fluid pressure and being urged away from said valve seat by said pressure, resilient means in the bore and positioned between the closure plug and the valve plunger for urging the end engaging portion of the valve plunger against the internal valve seat in opposition to the inlet fluid pressure, the arrangement of the end engaging portion and the internal valve seat constituting a poppet valve means to make a good seal, the arrangement of the valve plunger slidably moving in the bore constituting a slide valve means to regulate the fluid communication from the bore to the fluid outlet through the said aperture means in the side of the sleeve, the portion of the bore in which the resilient means is positioned between the valve plunger and the closure plug being in restricted fluid communication with the outlet to provide a shock absorber effect to the slidable movements of the plunger within the said bore, said inlet fluid pressure acting upon the said end engaging portion of the valve plunger constituting the sole means for moving the valve plunger away from said valve seat, the upper end of said hollow sleeve extending outwardly from the casing, and an external and readily removable closure cap for the upper end of the sleeve, said closure cap being provided with internal female threads for threadably engaging the male threads on the upper end of the hollow sleeve.

3. A fluid pressure regulating and relief valve adapted to fit into a casing provided with an elongated opening having a fluid inlet and a fluid outlet and having a terminal shoulder surface at the bottom end thereof and female threads at the upper end thereof, comprising, in combination, a hollow sleeve arranged to fit into the elongated opening, said sleeve having at the bottom end thereof an abutting surface for engaging said terminal shoulder surface and having at the upper end thereof male threads for threadably engaging the said female threads, the threadable engagement between said threads constraining the abutting surface of the sleeve against the terminal shoulder surface to make a good seal therebetween, said hollow sleeve having an internal bore extending therethrough, said bore being provided at the upper end thereof with female threads and at the lower end thereof with an internal valve seat having a valve opening therethrough in communication with the fluid inlet, a closure plug fitting in the upper end of the hollow sleeve and having male threads for threadably engaging the female threads in the internal bore of the sleeve, said hollow sleeve having aperture means in the side thereof spaced from said internal valve seat and providing fluid communication between said bore and said fluid outlet, a valve plunger slidably mounted in the bore and having an end engaging portion engaging the internal valve seat, said end engaging portion being exposed to the inlet fluid pressure and being urged away from said valve seat by said pressure, resilient means in the bore and positioned between the closure plug and the valve plunger for urging the end engaging portion of the valve plunger against the internal valve seat in opposition to the inlet fluid pressure, the arrangement of the end engaging portion and the internal valve seat constituting a poppet valve means to make a good seal, the arrangement of the valve plunger slidably moving in the bore constituting a slide valve means to regulate the fluid communication from the bore to the fluid outlet through the said aperture means in the side of the sleeve, the portion of the bore in which the resilient means is positioned between the valve plunger and the closure plug being in restricted fluid communication with the outlet to provide a shock absorber effect to the slidable movements of the plunger within the said bore, said inlet fluid pressure acting upon the said end engaging portion of the valve plunger constituting the sole means for moving the valve plunger away from said valve seat, and a closure cap for the upper end of the hollow sleeve.

4. A fluid pressure regulating and relief valve adapted to fit into a casing provided with an elongated opening having a fluid inlet and a fluid outlet and having a terminal shoulder surface at the bottom end thereof and female threads at the upper end thereof, comprising, in combination, a hollow sleeve arranged to fit into the elongated opening, said sleeve having at the bottom end thereof an abutting surface for engaging said terminal shoulder surface and having at the upper end thereof male threads for threadably engaging the said female threads, the threadable engagement between said threads constraining the abutting surface of the sleeve against the terminal shoulder surface to make a good seal therebetween, said hollow sleeve having an internal bore extending therethrough, said bore being provided at the upper end thereof with female threads and at the lower end thereof with an internal valve seat having a valve opening therethrough in communication with the fluid inlet, a closure plug fitting in the upper end of the hollow sleeve and having male threads for threadably engaging the female threads in the internal bore of the sleeve, said hollow sleeve having aperture means in the side thereof spaced from said internal valve seat and providing fluid communication between said bore and said fluid outlet, a valve plunger slidably mounted in the bore and having an end engaging portion engaging the internal valve seat, said end engaging portion being exposed to the inlet fluid pressure and being urged away from said valve seat by said pressure, a relatively long spring in the bore and positioned between the closure plug and the valve plunger for urging the end engaging portion of the valve plunger against the internal valve seat in opposition to the inlet fluid pressure, the arrangement of the end engaging portion and the internal valve seat constituting a poppet valve means to make a good seal, the arrangement of the valve plunger slidably moving in the bore constituting a slide valve means to regulate the fluid communication from the bore to the fluid outlet through the said aperture means in the side of the sleeve, the portion of the bore in which the resilient means is positioned between the valve plunger and the closure plug being in restricted fluid communication with the outlet to provide a shock absorber effect to the slidable movements of the plunger within the said bore, said inlet fluid pressure acting upon the said end engaging portion of the valve plunger constituting the sole means for moving the valve plunger away from said valve seat, and a closure cap for the upper end of the hollow sleeve, said valve plunger and said closure plug each having a recess to receive the ends of the relatively long spring.

RUSSELL P. DUNMIRE.